No. 693,574. Patented Feb. 18, 1902.
P. SYNNESTVEDT.
VEHICLE DRIVING MECHANISM.
(Application filed Dec. 23, 1901.)

(No Model.) 2 Sheets—Sheet 1.

Witnesses. Inventor:

No. 693,574. Patented Feb. 18, 1902.
P. SYNNESTVEDT.
VEHICLE DRIVING MECHANISM.
(Application filed Dec. 23, 1901.)

(No Model.) 2 Sheets—Sheet 2.

Witnesses: Inventor:

UNITED STATES PATENT OFFICE.

PAUL SYNNESTVEDT, OF GLENVIEW, ILLINOIS.

VEHICLE-DRIVING MECHANISM.

SPECIFICATION forming part of Letters Patent No. 693,574, dated February 18, 1902.

Application filed December 23, 1901. Serial No. 86,949. (No model.)

*To all whom it may concern:*

Be it known that I, PAUL SYNNESTVEDT, a citizen of the United States of America, residing at Glenview, in the county of Cook and State of Illinois, have invented certain new and useful Improvements in Vehicle-Driving Mechanism, (Case No. 6,) of which the following, taken in connection with the accompanying drawings, is a specification.

This invention has reference to improvements in mechanism for automobiles or other like vehicles, and has for its object the provision of an improved mechanism for transmitting the driving-power from the motor to the driving-wheel and for controlling the same, all of which will be better understood by reference to the accompanying drawings, in which—

Figure 1:
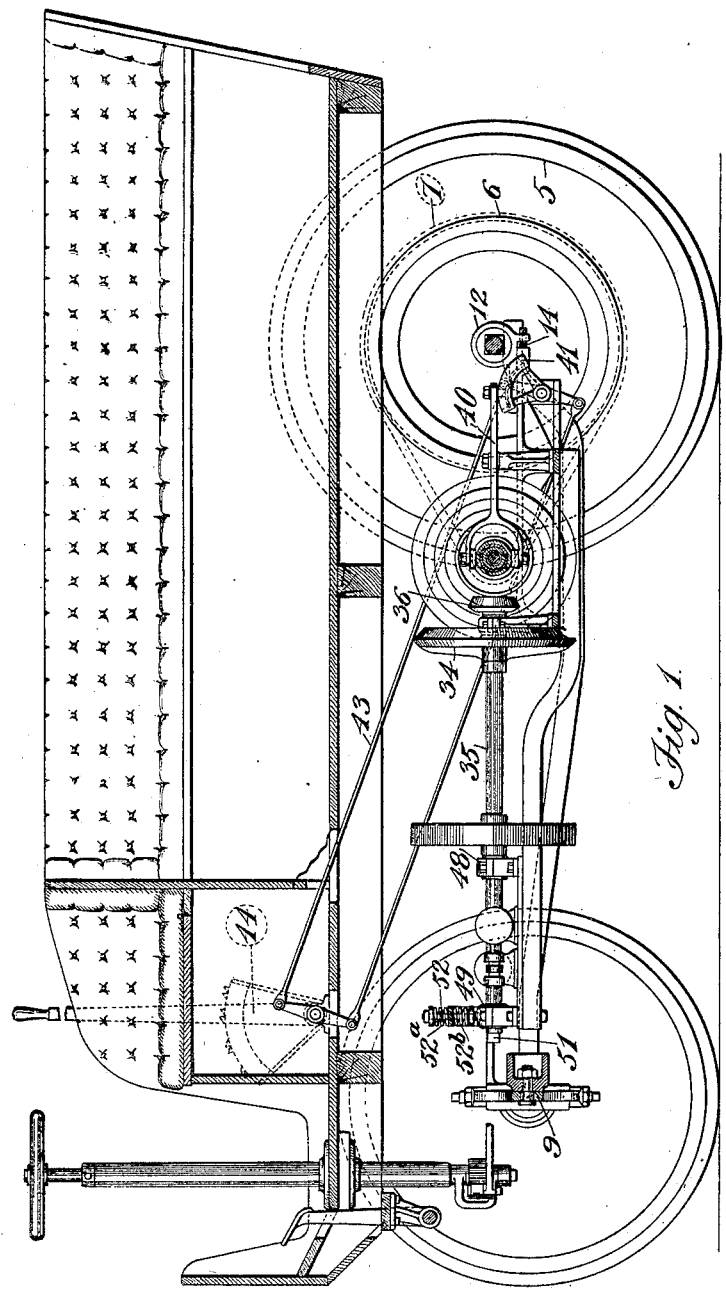
Figure 2:
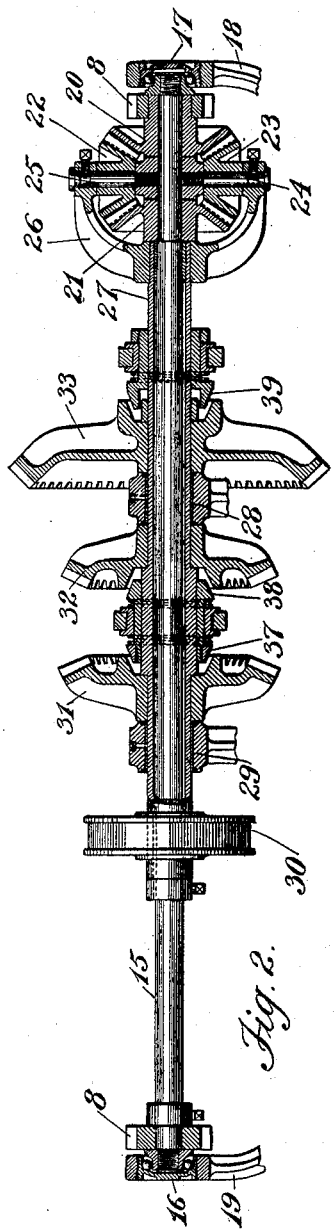
Figure 3:
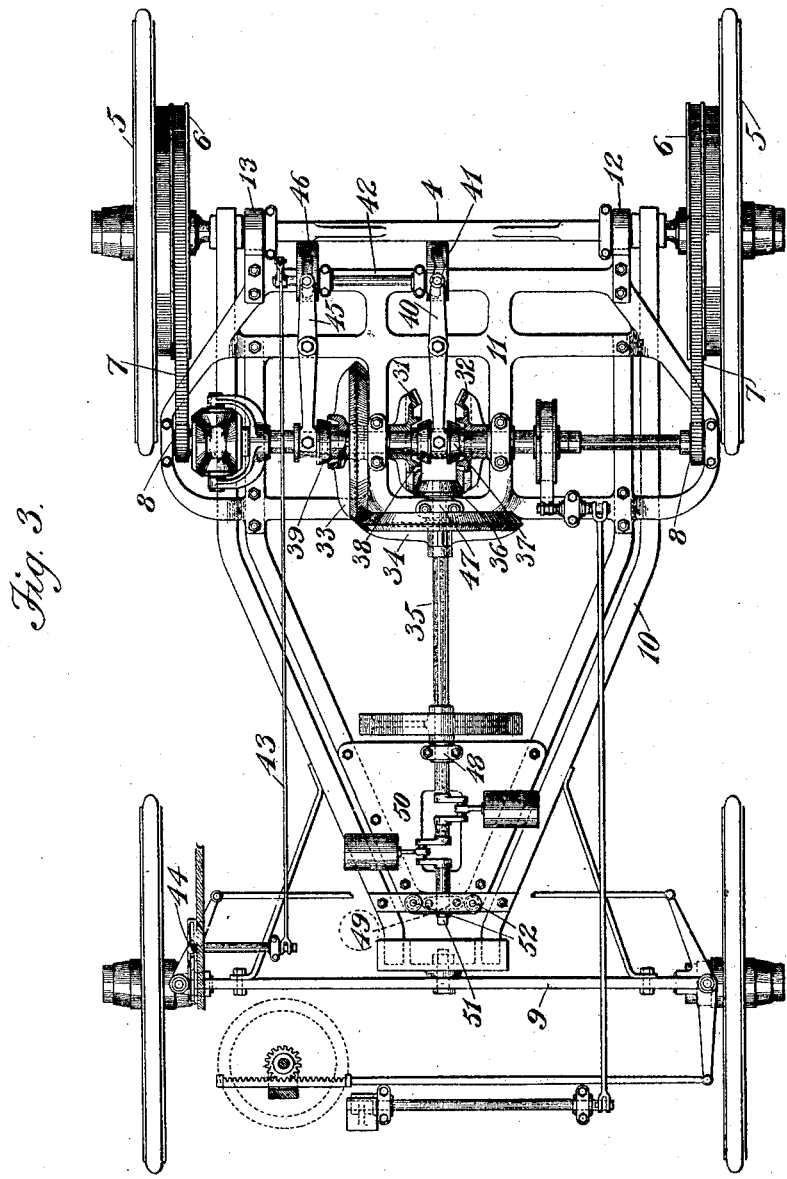

Figure 1 is a sectional view showing a vehicle to which my invention has been applied. Fig. 2 is an enlarged sectional view of a certain portion of the driving mechanism, and Fig. 3 is a plan view showing the relative arrangement of the parts.

In carrying out my invention I provide, first, a fixed or non-rotative axle 4, about which are a couple of rotatable driving-wheels 5, provided with sprocket-wheels 6, driven by chains or other flexible driving-gear 7, and a couple of small sprocket-wheels 8, carried on opposite ends of a driving-shaft, which is of complex construction and clearly shown in Fig. 2.

Between the rear axles 4 and the forward axle 9 is mounted what I will term the "vehicle-frame" 10, which has pivotal connection with the forward axle 9, as shown. As a support for the driving-shaft I arrange a driving-frame 11, independent of the vehicle-frame and supported at the rear axle and upon the latter by means of two rotatable bearings 12 and 13, constructed with adjustable or extensible devices 14 (see Fig. 1) for regulating or adjusting the tension of the flexible driving connection 7.

The driving-shaft comprises a continuous inner solid shaft 15, having bearings at each end thereof 16 and 17, carried in bracket-arms 18 and 19, forming a portion of the driving-frame 11, the bearings 16 and 17 being preferably arranged outside of or beyond the driving-pinion 8, which carries the flexible driving mechanism 7. Upon the shaft 15, at one end thereof, is mounted a differential gear, one side wheel 20 of which drives one of the pinions 8, while the other, 21, is keyed to the shaft 15 and drives the other pinion 8 on the opposite end. The central portion of the differential gear, including the small wheels 22 and 23 and the pivot-pins thereof 24 and 25, are rotatable upon the shaft and driven by means of the arm or forked piece 26, keyed to the tube or sleeve 27, which surrounds the rod 15 and is carried in journals 28 and 29, formed in the frame 11. Upon the opposite end of the sleeve 27 is the brake-wheel 30, and adjacent to the two bearings 28 and 29 are mounted three beveled gears, one of which, 31, is the back-up gear, another of which, 32, is the slow-speed-ahead gear, and the third of which, 33, is the fast-speed-ahead gear. The gear 33 meshes with a gear 34, keyed to the motor-shaft 35, and another gear 36, keyed to the motor-shaft 35, drives both the gears 31 and 32, only one of which is in engagement with the driving-shaft at the same time, the engagement of the several gears being determined by means of the friction-clutches 37, 38, and 39. The clutches 37 and 38 are operated by means of the lever 40, through rotation of the segmental cam 41, mounted upon a shaft 42, which is rotated or rocked by means of the connections 43 and the hand-lever 44. (See Fig. 1.) The friction-clutch 39 is governed by the lever 45, through the segmental cam 46, also carried on the shaft 42 and operated by the hand-lever 44. Thus the movements of the hand-lever forward or back determine the positions of the cams 41 and 46 and the positions of the levers 40 and 45, and consequently the operation of the friction-clutches 37, 38, and 39.

The motor-shaft 35 is carried in journals 47, 48, and 49, formed in the driving-frame 11.

While I have shown the motor 50 as provided with two horizontal cylinders, it is obvious that any other device or motor may be used, as preferred, and, in fact, the common practice is to employ motors with vertical cylinders in substantially the same position. The motor-shaft 35 has a square projecting end 51 for starting the engine by means of the usual removable end-crank arrangement. The driving-frame 11 at its forward end is carried from the vehicle-frame by means of the spring suspension devices 52, which are provided with springs 52$^a$ and 52$^b$, acting, respectively, upward and downward, so as to yieldingly govern the movements of this end of the driving-frame whether the motor be turning forward or back.

From the above, as well as from an examination of the drawings, it will be seen that in mounting the parts of my driving mechanism, as shown, I have put all of the machinery or gear-driving devices, as well as the controlling cams and levers and clutches which actuate the same, on the same frame with the motor and its shaft, so that the whole is, as it were, self-contained and separate from the balance of the vehicle, saving the body of the vehicle from jar, and at the same time so connected with and supported thereby as to drive the driving-wheels by the flexible driving connections shown with a minimum loss of energy and a minimum liability to derangement.

Having thus described my invention, what I claim as new, and desire to secure by Letters Patent, is—

1. A vehicle-driving mechanism comprising a fixed axle, a pair of driving-wheels rotatably mounted upon said axle, a driving-shaft, flexible driving connections between said wheels and said shaft, a motor-shaft, having its axis at right angles with said driving-shaft, and a driving-frame carrying said driving-shaft and motor-shaft, and supported at one of its ends upon said axle, and at the other spring-supported from the vehicle-frame, substantially as described.

2. A vehicle-driving mechanism comprising a fixed axle, a pair of driving-wheels rotatably mounted upon said axle, a driving-shaft, flexible driving connections between said wheels and said shaft, a motor-shaft having its axis at right angles with said driving-shaft, and a driving-frame carrying said driving-shaft and motor-shaft, and supported at one of its ends upon said axle, and at the other spring-supported from the vehicle-frame, and beveled driving-gears between said motor-shaft and driving-shaft, substantially as described.

3. A vehicle-driving mechanism comprising a fixed axle, a pair of driving-wheels rotatably mounted upon said axle, a driving-shaft, flexible driving connections between said wheels and said shaft, a motor-shaft, having its axis at right angles with said driving-shaft, and a driving-frame carrying said driving-shaft and motor-shaft, and supported at one of its ends upon said axle, and at the other spring-supported from the vehicle-frame, beveled driving-gears between said motor-shaft and driving-shaft, and levers controlling friction-clutch mechanisms for determining the action of said beveled gears, substantially as described.

4. A vehicle-driving mechanism comprising a fixed axle, a pair of driving-wheels rotatably mounted upon said axle, a driving-shaft, flexible driving connections between said wheels and said shaft, a motor-shaft, having its axis at right angles with said driving-shaft, and a driving-frame carrying said driving-shaft and motor-shaft, and supported at one of its ends upon said axle, and at the other spring-supported from the vehicle-frame, beveled driving-gears between said motor-shaft and driving-shaft, and cam-actuated levers for governing the operation of said beveled gears, substantially as described.

5. In a vehicle-driving mechanism the combination of a driving-shaft, comprising an inner rod, a sleeve surrounding said rod, bearings for said rod, and bearings for said sleeve within said rod-bearings, driving mechanism for said sleeve, said driving mechanism comprising a plurality of gears mounted upon said sleeve, and adapted to have engagement therewith by means of friction-clutches, and means for throwing said friction-clutches, substantially as described.

6. In a vehicle-driving mechanism the combination of a driving-shaft, comprising an inner rod, a sleeve surrounding said rod, bearings for said rod, and bearings for said sleeve within said rod-bearings, driving mechanism for said sleeve, said driving mechanism comprising a plurality of gears mounted upon said sleeve, and adapted to have engagement therewith by means of friction-clutches, and means for throwing said friction-clutches, the bearings for said sleeve and said rod being formed in a driving-frame, substantially as described.

7. In a vehicle-driving mechanism the combination of a driving-shaft, comprising an inner rod and a sleeve surrounding said rod, gearing mounted upon said sleeve for driving the same, a motor-shaft engaging said gearing, means for controlling the operation of said gearing, said driving-shaft, motor-shaft, and operating means, all being carried by the driving-frame, substantially as described.

8. In a vehicle-driving mechanism the combination of a driving-shaft, comprising an inner rod and a sleeve surrounding said rod, gearing mounted upon said sleeve for driving the same, a motor-shaft engaging said gearing, means for controlling the operation of said gearing, said driving-shaft, motor-shaft, and operating means, all being carried by the driving-frame, said driving-frame being mounted about a fixed axle at one end and spring-supported at the other end, substantially as described.

In testimony whereof I have hereunto set my hand in the presence of two subscribing witnesses.

PAUL SYNNESTVEDT.

Witnesses:
PAUL CARPENTER,
H. W. SMALLEY.